(12) United States Patent  
Schwindt

(10) Patent No.: US 8,684,124 B2  
(45) Date of Patent: Apr. 1, 2014

(54) MONOSHOCK GAS SUSPENSION SYSTEM

(75) Inventor: Jeffrey R. Schwindt, Indianapolis, IN (US)

(73) Assignee: AirFX, LLC, Indianapolis, IN (US)

( * ) Notice: Subject to any disclaimer, the term of this patent is extended or adjusted under 35 U.S.C. 154(b) by 1699 days.

(21) Appl. No.: 11/530,900

(22) Filed: Sep. 12, 2006

(65) Prior Publication Data

US 2008/0067778 A1    Mar. 20, 2008

(51) Int. Cl.
*B62K 11/00* (2013.01)
*B62K 25/04* (2006.01)

(52) U.S. Cl.
USPC ............................ 180/227; 280/276; 280/284

(58) Field of Classification Search
USPC ........... 180/227, 219; 280/275, 276, 283, 284
See application file for complete search history.

(56) References Cited

U.S. PATENT DOCUMENTS

| | | | | |
|---|---|---|---|---|
| 6,105,988 | A * | 8/2000 | Turner et al. | 280/276 |
| 6,533,305 | B1 * | 3/2003 | Falk | 280/276 |
| 6,688,626 | B2 * | 2/2004 | Felsl et al. | 280/275 |
| 6,871,718 | B2 * | 3/2005 | McGuire | 180/210 |
| 2003/0141678 | A1 * | 7/2003 | McGuire | 280/5.515 |
| 2003/0234144 | A1 * | 12/2003 | Fox | 188/278 |

* cited by examiner

*Primary Examiner* — Anne Marie M Boehler

(57) ABSTRACT

A suspension system for use with a motorcycle includes a device for producing a supply of pressurized air. The suspension system is operably disposed between a frame member and a wheel frame member of the motorcycle. The suspension system comprises at least one double-acting pneumatic cylinder.

32 Claims, 5 Drawing Sheets

MONOSHOCK GAS SUSPENSION SYSTEM

FIELD OF THE INVENTION

This invention generally relates to vehicle suspension systems. More particularly, in an illustrated embodiment, the invention is directed to a gas suspension system for a front or rear suspension component in a motorcycle.

BACKGROUND OF THE INVENTION

In general terms, motorcycles typically include a main frame to which the engine is attached. One or more sub-frames or like elements can be movably attached to the main frame, each of which can be adapted to hold one of the motorcycle wheels. The moving sub-frames may permit the motorcycle front and rear wheels to move relative to the main frame.

Traditionally, motorcycle suspension systems for street bikes have included one or more springs (typically coil springs) and a hydraulic damper unit applied to each of the front and rear wheel to provide the lift and dampening needed to suspend the vehicle and control movement of the wheels during compression and rebound of the wheels. Such a spring and damper unit may be positioned inside a telescoping fork assembly on the front wheel to assist with controlling the front wheel. Another form of a front fork, referred to as a "springer" fork, includes a spring suspension operating between two pairs of parallel fork members in a well known manner.

Still other suspension systems may be employed on the rear wheel of the motorcycle. For example, a spring and damper unit may be fastened between a swing arm and main frame in the rear of the motorcycle to control the rear wheel assembly and associated parts. Other suspension systems may use air in place of or in addition to the spring. These systems are often called air-ride suspension systems, and may use rubber air bags as springs and may further be charged using a compressed air system. Compressed air may be varied to control the ride height and the ride characteristics (i.e. firmness) of the motorcycle. However, the ride will inherently get firmer as the air pressure increases in these systems.

SUMMARY OF THE INVENTION

The present invention relates to a suspension system having a double-acting air cylinder. In one illustrative embodiment, the double acting cylinder is a single cylinder positioned between the front wheel of a motorcycle and the motorcycle main frame. In another embodiment, the double acting cylinder is a single cylinder positioned between the rear wheel of the motorcycle and the motorcycle main frame. In yet another embodiment, two or more double-acting cylinders are axially aligned and provide two or more chambers having compressed gas for controlling the suspension characteristics in a motorcycle.

The system disclosed herein could be applied to other vehicles or suspension systems, such as those found in autos and trailers. Accordingly, as referred to herein, the term "motorcycle" and the like may be substituted by "vehicle", "auto", "trailer", or any other use that could incorporate the suspension system disclosed herein. Further features and advantages of the invention will be readily apparent from the specification and from the drawings.

Moreover, although the illustrated embodiments relate to a suspension system for a front wheel, it should be understood that the concepts described herein can be applied to a rear wheel suspension system with few or no modifications, and rear wheel suspension systems are within the scope of the disclosure.

DETAILED DESCRIPTION OF THE INVENTION

Figure 1:
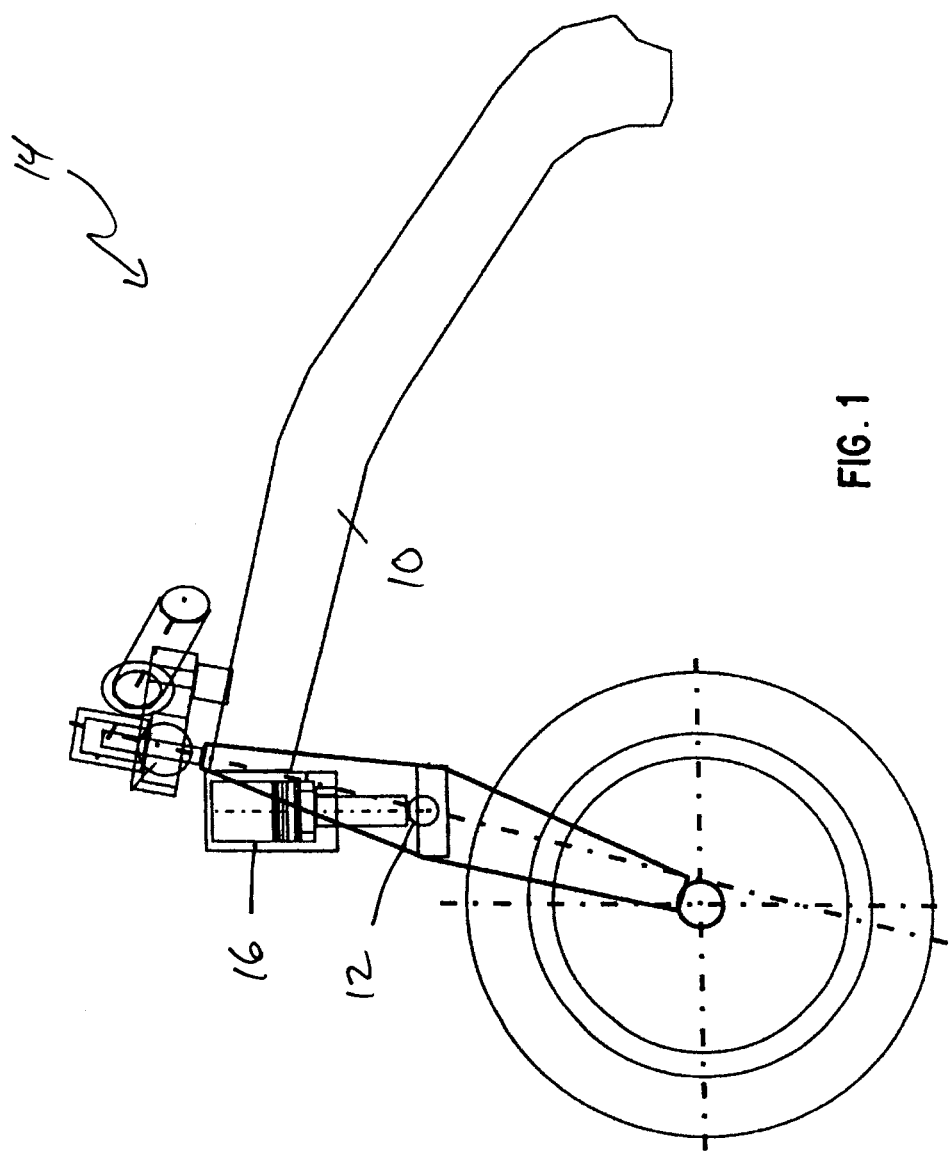
FIG. 1 shows a partial motorcycle frame and front wheel having a suspension system connected thereto.

FIG. 1 illustrates a well-known main frame 10 and front wheel frame 12 for a motorcycle 14. Such a main frame 10 and front wheel frame 12 function together in a well known manner and a number of suspension systems have been proposed, designed and marketed which provide suspension functions to the front wheel frame 12 of such a motorcycle 14. Generally, the front wheel frame 12 is connected to a suspension component 16 that absorbs forces resulting from the front wheel's movement or contact with objects during operation of the motorcycle 14. A suspension component 16 is connected to and operates between main frame 10 and front wheel frame 12 (or in a non-illustrated embodiment, between main frame 10 and a rear wheel frame).

Figure 2:
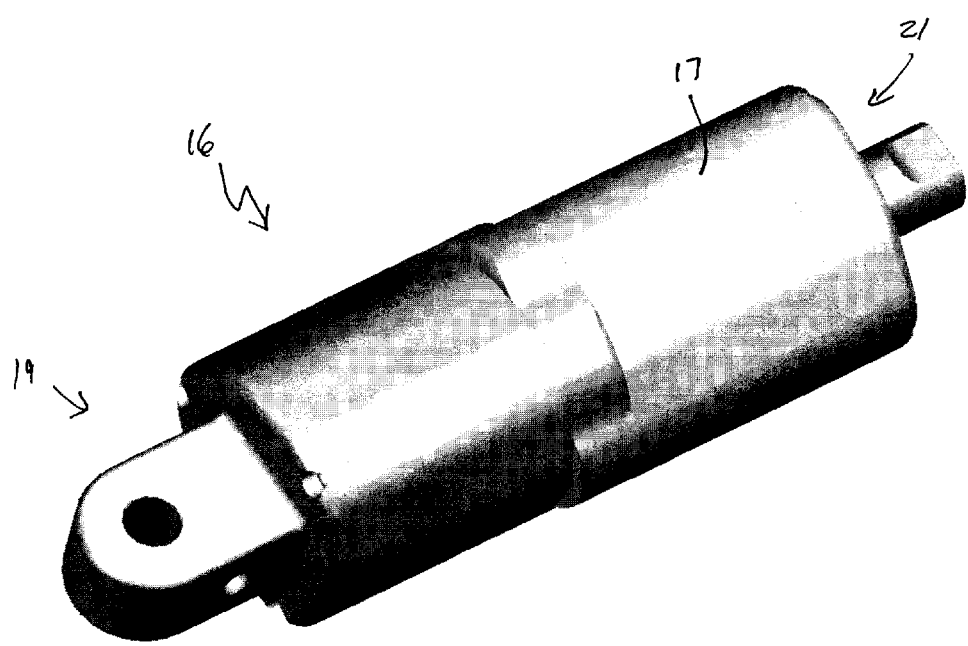
FIG. 2 shows an external perspective view of a gas suspension system according to one embodiment of the invention.

FIG. 2 shows one embodiment of a suspension component 16, wherein the suspension component includes a housing 17 having a first end 19 and a second end 21. First end 19 is illustratively configured to be connected to the main frame 10 of the motorcycle, and second end 21 is illustratively configured to connect to the wheel (either front or rear) frame. In the illustrated embodiment, suspension component 16 comprises at least a part of the front suspension assembly of the motorcycle, and compresses and extends to adjust for inconsistencies in the road, allowing the front (or rear) tire to maintain contact with the road for better handling and braking without the rider feeling the up-and-down movement of the wheel.

Figure 3:
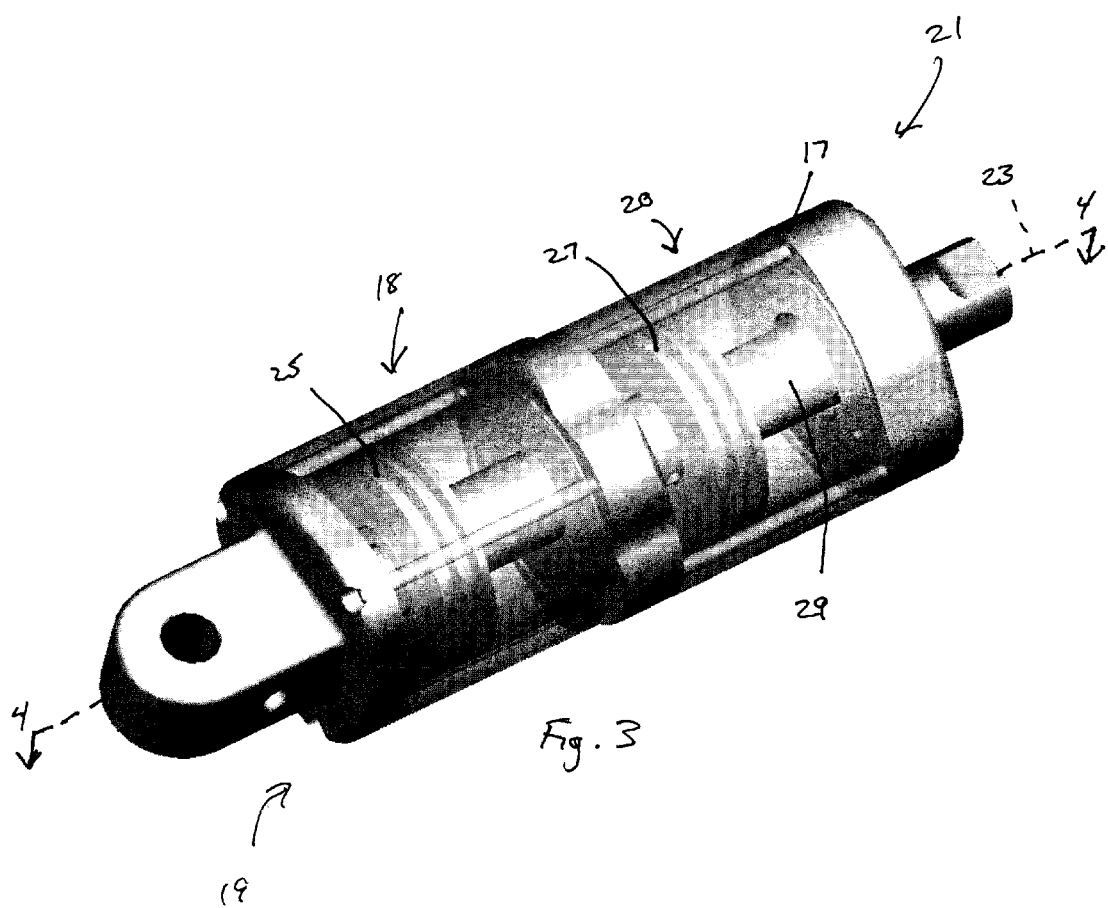
FIG. 3 shows a view of the gas suspension system of FIG. 2, wherein portions of the housing walls have been removed to show illustrate the double-acting pistons inside the housing.

FIG. 3 is a view of the suspension component 16 of FIG. 2, wherein the housing walls have been removed to reveal the two double-acting cylinders 18, 20 housed within housing 17. In such an embodiment, double-acting cylinders 18, 20 are arranged coaxially along axis 23 and pistons 25, 27 move axially together relative to housing 17. Suspension component 16 is in pneumatic communication with a system 22 (shown in FIG. 5) that provides compressed gas to the double-acting cylinders 18, 20. In the illustrated embodiment, air is disclosed as the compressed gas. However, it should be understood that the use of other gases is within the scope of the invention.

Housing 17 of suspension component 16 is capable of holding pressurized air. Although the illustrated housing defines a pair of axially aligned air cylinders 18, 20, it is contemplated that other arrangements are possible, and within the scope of the invention. Moreover, it is possible for a single air cylinder 18 to be used, rather than the use of two axially aligned air cylinders. Accordingly, it should be understood that embodiments described herein that disclose two double-acting cylinders can also be configured as a single double-acting cylinder. However, the use of more than one axially aligned air cylinder, such as described herein, provides the advantage of greater resistance over a smaller stroke range.

Figure 4:
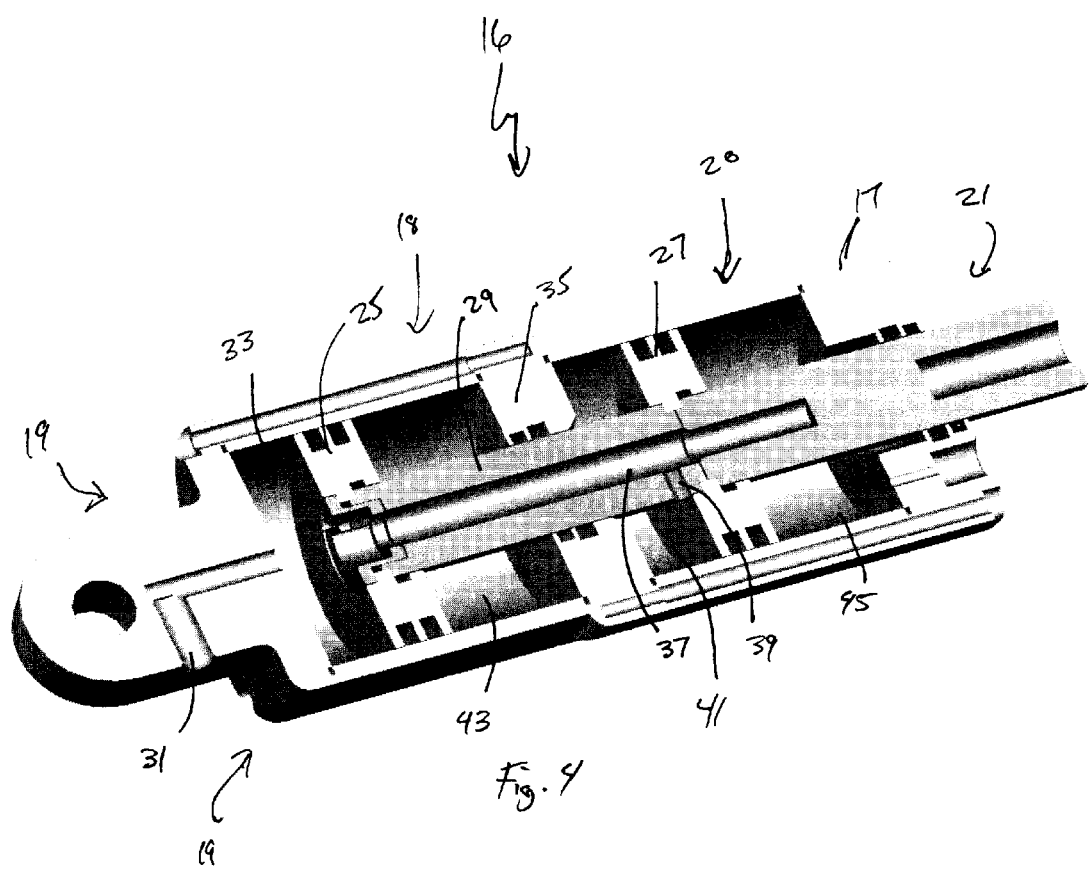
FIG. 4 shows a sectional view of the gas suspension system of FIGS. 2 and 3, taken along the line 4-4 shown in FIG. 3.

As shown in FIGS. 3 and 4, disposed within the air cylinders 18, 20 are a respective pair of pistons 25, 27, which are sealed in the cylinders so as to prevent loss of air pressure. Such pistons are positioned to reciprocate within the cylinder bores. Pistons 25, 27 are connected via piston rod 29. Furthermore, housing 17 has a port 31 formed therein for directing compressed air through the housing 17 into chamber 33 of cylinder 18. As compressed air fills chamber 33, piston 25 is urged toward cylinder baffle 35. Compressed air can also be directed through channel 37 that is illustratively bored through the axial center of piston rod 29. This compressed air is then directed through port 39 into chamber 41, providing for simultaneous compression of chambers 33, 41. Opposing chambers 43, 45 may be filled with a compressed gas or ambient air, as further disclosed below. The resulting effect is that both pistons 25, 27 will be positioned within their respective double-acting cylinders 18, 20, and suspended by the compressed air in the opposing chambers 33, 41 and chambers 43, 45. When pressurized air enters chambers 33, 41, pistons 25, 27 are forced toward second end 21 of suspension component 16, thereby causing piston rod 29 to extend. Such extension of suspension component 16 can also provide for raising or lowering of the entire motorcycle.

Figure 5:
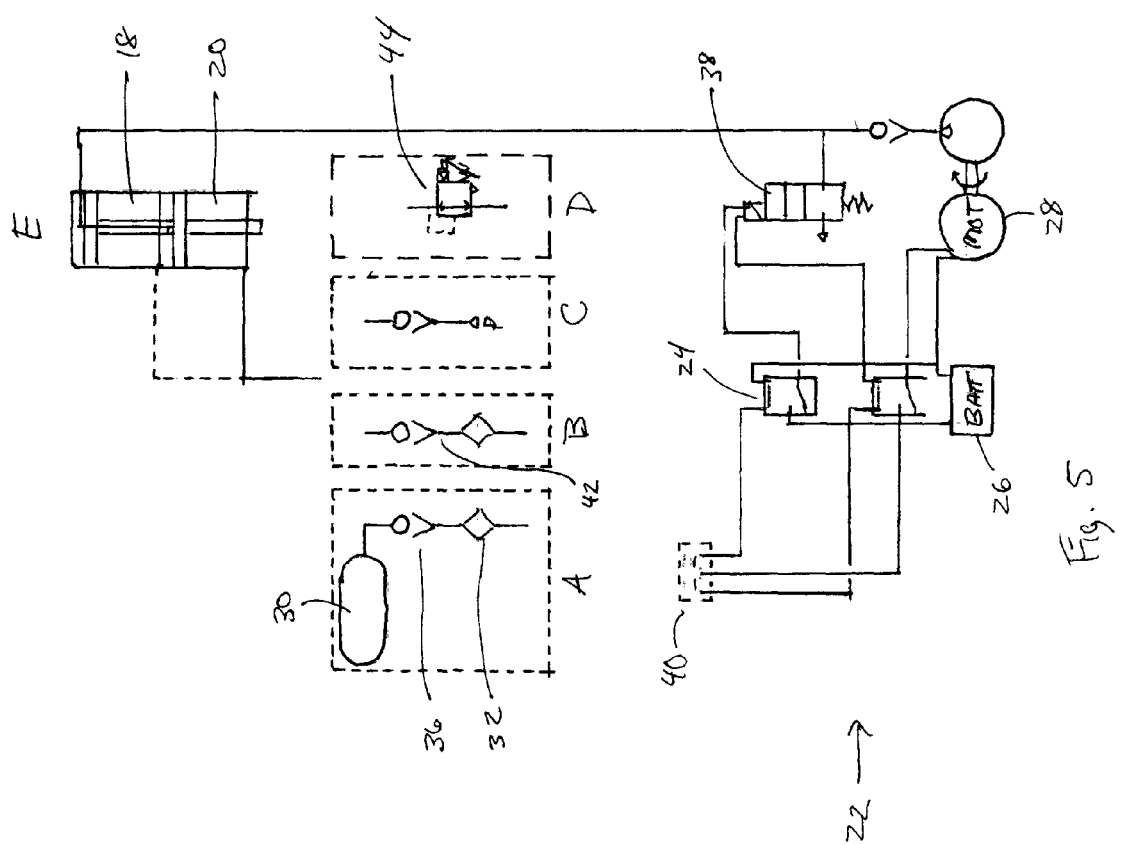
FIG. 5 is a schematic view and description of various embodiments of the invention.

Compressed air to suspension component 16 is illustratively provided with a system (and variations) 22 such as that shown in FIG. 5. As seen in FIG. 5, system 22 comprises a relay 24 connected to a battery 26 (illustratively the motorcycle battery). Closing relay 24 permits electricity from battery 26 to operate an air motor or compressor 28. In one embodiment, the relay 24 is in the same circuit as the ignition switch; therefore, the activation of the ignition switch closes relay 24 and permits operation of compressor 28.

System 22 may be configured such as that shown in FIG. 5A, wherein compressor 28 is configured to supply compressed air to a volume chamber 30. A filter 32 may also be incorporated into system 22 to filter impurities, such as particulate matter and oil. Pressure in volume chamber 30 is set by an operator pressing one of buttons 40 until the desired pressure (and ride characteristics) are achieved. A check valve 36 can be incorporated to retain the air in volume chamber 30. Volume chamber 30 may be a separate chamber or may be part of the motorcycle frame, such that a frame member of the motorcycle functions as a volume chamber and could contain pressurized air.

As shown in FIG. 5, a solenoid valve 38 may be incorporated in system 22. Solenoid 38 permits an operator to dump pressure from the system, thereby softening the ride and/or lowering the ride height for the operator. Furthermore, system 22 could be configured such that compressor 28 will not operate unless the ignition switch is turned to the "lights on" position.

Push buttons 40 can also be provided for controlling the compressed air in the double acting cylinders. Such push buttons 40 may be located in a position convenient to a motorcycle rider, such as near or on the handle bars. The push buttons 40 control the compressed gas pressure in double acting cylinders 18, 20 by either directing additional compressed air to be added to double acting cylinders 18, 20 or bleeding air from cylinders 18, 20. By varying the amount of compressed air in cylinders 18, 20, the ride height, ride quality, and/or spring rate of the cylinders can be modified to the user's liking or needs.

Another embodiment of the invention is shown in FIG. 5B. In such an embodiment, pressure in opposing chamber 43, 45 (visible in FIG. 4) can be controlled simply via a check valve 42, shown in FIG. 5B. Such a check valve 42 would allow for the intake of ambient air into opposing chambers 43, 45 when the system is not energized (i.e. chambers 33, 41 are not energized with compressed air). For example, during the initial installation of the check valve, the initial suspension travel (extension) will suction air through check valve 42 into chamber 45, and the check valve will seat. This air is now trapped and will act as an air spring and biasing element. When the system is later energized, check valve 42 would seal, and opposing chamber 45 would provide an opposing bias as chambers 33, 41 are further energized.

Importantly, for all embodiments disclosed herein, it is possible (and sometimes preferable) for a check valve to be installed on both chambers 43, 45 to trap air. Consequently, either or both chambers 43, 45 could be charged with pressurized air depending on the use or desired suspension qualities. For example, when a firmer ride is desired, both chambers 43, 45 can be charged with compressed gas or air.

In yet another alternative embodiment, shown in FIG. 5C, chambers 43, 45 may be pre-pressurized to a pre-selected level prior to delivery to the consumer. A desirable pre-selected pressurization level has been determined to be approximately three pounds-per-square-inch, but any pressure above zero psi and below 10 psi is contemplated to be within the scope of the invention.

In a further embodiment illustrated in FIG. 5D, pressurized air can be supplied to the opposing chambers 43, 45 at a secondary pressure to offset the primary pressure in chambers 33, 41. Such a secondary air pressure is generated by a biasing regulator 44. One example of a biasing regulator 44 is a Type 200 Precision Air Relay manufactured by ControlAir Inc.; more information can be obtained at www.controlair.com. The biasing regulator 44 is supplied with pressurized air from system 22 and may be preset by the system manufacturer, motorcycle manufacturer or in the alternative, adjusted for ride characteristics by the operator.

In the embodiment illustrated in FIG. 5D, a biasing regulator 44 is connected to chambers 18, 20, and is configured to deliver a secondary pressure at a pressure relative to that of chambers 18, 20 to opposing chambers 43, 45. Such a configuration is provided in part to offset the pressure in chambers 33, 41. This pressure in chambers 33, 41 controls the rebound of the suspension component, and of the front or rear end of the motorcycle as a whole.

Biasing regulator 44 further provides a counterbalance to the air spring effect on an opposite side (i.e. chambers 43, 45) of the piston as that of the main air suspension pressure (chambers 33, 41). The biasing regulator maintains a ratio or proportional counterforce to the air spring unloaded setting, and thus, provides the rebound control in a manner which tracks any changes in the main air spring pressure. Air functions as an ideal spring due to the fact that the spring rate is progressive during compression in contrast to most springs, which have a linear fixed compression rate.

In the disclosed embodiment, first end 19 (and second end 21), shown in FIGS. 2-4, may be fitted with a self-lubricating bearing material on the bearing contact surface 50 that permits extended function. Furthermore, the tolerances for first and second ends 19, 21 may be such that the suspension component 18 may be installed on a variety of motorcycles and even on frames having slight offsets or imperfections. Moreover, due to the small size of suspension component 16 (less than diameter of a standard monoshock 3.25" and the same overall length), the presently disclosed system may be substituted for nearly any existing suspension component.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the spirit and scope of the disclosure and as further defined by the following claims.

What is claimed is:

1. A motorcycle frame comprising
a main frame
a wheel frame coupled to the main frame and configured to support a motorcycle wheel thereon, and
a suspension component coupled to the main frame and the wheel frame,
wherein the suspension component comprises a single body housing and two rigidly connected double-acting pneumatic cylinders in axial alignment therein.

2. The motorcycle frame of claim 1, further comprising a compressor coupled to the double-acting pneumatic cylinders.

3. The motorcycle frame of claim 1, wherein the double-acting pneumatic cylinders are in pneumatic communication with each other.

4. The motorcycle frame of claim 3, wherein the double-acting pneumatic cylinders communicate via an internal port disposed inside a piston rod.

5. The motorcycle frame of claim 1, wherein each double-acting pneumatic cylinder comprises a piston positioned within an elongated cylinder, the piston defining a first chamber at one end of the cylinder and a second chamber at the opposite end of the cylinder.

6. The motorcycle frame of claim 5, wherein the first chamber is in communication with a compressed air source.

7. The motorcycle frame of claim 5, wherein the second chamber is in communication with ambient air.

8. The motorcycle frame of claim 7, further comprising a check valve coupled to at least one of the first and second chamber, the check valve permitting the intake of ambient air into the at least one of the first and second chamber.

9. The motorcycle frame of claim 5, wherein the second chamber is pre-pressurized to a predetermined pressure.

10. The motorcycle frame of claim 9, wherein the predetermined pressure is above zero and below ten pounds per square inch.

11. The motorcycle frame of claim 9, wherein the predetermined pressure is approximately three pounds per square inch.

12. The motorcycle frame of claim 5, wherein the second chamber is in communication with a biasing regulator.

13. The motorcycle frame of claim 12, wherein the biasing regulator maintains the pneumatic pressure of the second chamber as a ratio of the pneumatic pressure of the first chamber.

14. The motorcycle frame of claim 13, wherein the biasing regulator is adjustable.

15. The motorcycle frame of claim 1, wherein the wheel frame is a front wheel frame.

16. The motorcycle frame of claim 1, wherein the wheel frame is a rear wheel frame.

17. A motorcycle frame comprising
a main frame
a wheel frame coupled to the main frame and configured to support a motorcycle wheel thereon, and
a suspension component coupled to the main frame and supporting the wheel frame thereon,
wherein the suspension component comprises two double-acting pneumatic cylinders in axial alignment.

18. The motorcycle frame of claim 17, further comprising a compressor coupled to the double-acting pneumatic cylinders.

19. The motorcycle frame of claim 17, wherein the double-acting pneumatic cylinders are in pneumatic communication with each other.

20. The motorcycle frame of claim 19, wherein the double-acting pneumatic cylinders communicate via an internal port disposed inside a piston rod.

21. The motorcycle frame of claim 17, wherein each double-acting pneumatic cylinder comprises a piston positioned within an elongated cylinder, the piston defining a first chamber at one end of the cylinder and a second chamber at an opposite end of the cylinder.

22. The motorcycle frame of claim 21, wherein the first chamber is in communication with a compressed air source.

23. The motorcycle frame of claim 21, wherein the second chamber is in communication with ambient air.

24. The motorcycle frame of claim 21, further comprising a check valve coupled to at least one of the first and second chamber, the check valve permitting the intake of ambient air into the at least one of the first and second chamber.

25. The motorcycle frame of claim 21, wherein the second chamber is pre-pressurized to a predetermined pressure.

26. The motorcycle frame of claim 25, wherein the predetermined pressure is above zero and below ten pounds per square inch.

27. The motorcycle frame of claim 25, wherein the predetermined pressure is approximately three pounds per square inch.

28. The motorcycle frame of claim 21, wherein the second chamber is in communication with a biasing regulator.

29. The motorcycle frame of claim 28, wherein the biasing regulator maintains the pneumatic pressure of the second chamber as a ratio of the pneumatic pressure of the first chamber.

30. The motorcycle frame of claim 28, wherein the biasing regulator is adjustable.

31. The motorcycle frame of claim 17, wherein the wheel frame is a front wheel frame.

32. The motorcycle frame of claim 17, wherein the wheel frame is a rear wheel frame.

* * * * *